(12) United States Patent
Tsai et al.

(10) Patent No.: US 7,573,619 B2
(45) Date of Patent: Aug. 11, 2009

(54) PAPER FEEDING MECHANISM

(75) Inventors: Chen-Tsai Tsai, Taipei (TW);
Keng-Wei Shih, Taipei (TW);
Hsuan-Yang Lin, Taipei (TW);
Chang-Lung Yu, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 88 days.

(21) Appl. No.: 11/882,649

(22) Filed: Aug. 3, 2007

(65) Prior Publication Data

US 2008/0031667 A1  Feb. 7, 2008

(30) Foreign Application Priority Data

Aug. 4, 2006  (TW)  ............................... 95128719 A

(51) Int. Cl.
*H04N 1/04* (2006.01)
(52) U.S. Cl. ........................ 358/498; 358/496; 358/497; 358/474; 399/367; 399/374; 399/364
(58) Field of Classification Search .................. 358/496, 358/498, 474, 497, 401, 501; 399/367, 374, 399/364; 355/23, 24
See application file for complete search history.

(56) References Cited

U.S. PATENT DOCUMENTS

| | | | | |
|---|---|---|---|---|
| 4,419,007 A * | 12/1983 | Kingsley | ...................... | 399/85 |
| 5,597,153 A * | 1/1997 | Maruyama et al. | ............ | 271/4.1 |
| 5,784,680 A | 7/1998 | Taruki et al. | | |
| 5,953,574 A * | 9/1999 | Okada | ......................... | 399/374 |
| 6,081,687 A * | 6/2000 | Munemori et al. | .......... | 399/374 |
| 6,128,106 A * | 10/2000 | Watanabe et al. | ............ | 358/498 |
| 6,181,443 B1 * | 1/2001 | Takahashi et al. | ............ | 358/498 |
| 7,450,277 B2 * | 11/2008 | Poletto | ........................ | 358/498 |
| 2006/0280534 A1 * | 12/2006 | Cook et al. | ................... | 399/374 |
| 2007/0212140 A1 * | 9/2007 | Xu et al. | ...................... | 399/367 |
| 2008/0043294 A1 * | 2/2008 | Su et al. | ....................... | 358/474 |

* cited by examiner

Primary Examiner—Cheukfan Lee
(74) Attorney, Agent, or Firm—Rabin & Berdo, P.C.

(57) ABSTRACT

A paper feeding mechanism for carrying a paper passing through a scanning station having a scanning module includes a partition, a paper transporting device, and a switching member movably disposed corresponding to one end of the partition. A first paper feeding channel is formed between the partition and the scanning station, and a second paper feeding channel is formed on another side of the partition. The paper transporting device carries the paper passing over the side of the partition through the first paper feeding channel with a first page of the paper facing the scanning module. Then, the paper is flipped for a second page of the paper facing the scanning module. The switching member can be selectively moved for guiding the paper passing through the first paper feeding channel or the second paper feeding channel.

11 Claims, 7 Drawing Sheets

PAPER FEEDING MECHANISM

BACKGROUND OF THE INVENTION

1. Field of Invention

The present invention relates to a paper feeding mechanism, and more particularly, to a paper feeding mechanism capable of realizing fast double-side scanning.

2. Related Art

With the development of the photoelectric technology and the business, a great number of products having multiple functions, such as printers, scanners, copiers, and multi-functional peripherals (MFPs), using optical modules having photosensitive elements, have gradually become daily tools from professional tools due to the low price and good practicability.

Generally, if a single-side scanning apparatus in the prior art is used to scan both pages of a paper, a user has to manually flip the paper after one page has been scanned to proceed the scanning of the other page of the paper. Thus, speed for scanning both pages of a paper is low, and the paper feeding directions of the two pages of the paper may be different due to the careless operation. As for the aforementioned problem, manufacturers have developed a scanning apparatus that realizes double-side scanning, which scans two pages of a paper automatically. Therefore, the user can scan both pages of a piece of paper rapidly, and the problem of different paper feeding directions can be prevented.

Referring to FIG. 1, a scanning apparatus 10 is disclosed in U.S. Pat. No. 5,784,680 "Compact Auto-Document Feeder for an Image Forming Apparatus", in which a paper P placed on a paper holder 160 is transmitted to a first feeding channel 14 through a pick-up roller 11, a pair of separating rollers 12, and a pair of pull-out rollers 13, so as to scan a first page Pg1 of the paper P in a scanning station 15. After the first page Pg1 is scanned, the paper P is transmitted into a second feeding channel 17 with a pair of assisting rollers 16. As required, if only one side of the paper P needs to be scanned, after the first page Pg1 of the paper P is scanned, the paper P is transmitted to an ejecting tray 18 through the second feeding channel 17. If both sides of the paper P need to be scanned, after the first page Pg1 of the paper P is scanned, the paper P passes through the second feeding channel 17 and is transmitted to a switch-back channel 20 by an ejecting roller 19. The moving direction of the paper P is switched by the switch-back rollers 21, and the paper P is transmitted into the paper-flip channel 22. The paper P is flipped with a second page Pg2 facing the scanning station 15. Then the paper P is transmitted to pass over the scanning region 15, so that the second page Pg2 of the paper P is scanned. After that, the paper P is transmitted to the ejecting tray 18 through the second feeding channel 17.

The double-side scanning apparatus disclosed in U.S. Pat. No. 5,784,680 uses a plurality of roller for transmitting or flipping the paper to be scanned in the double-side scanning apparatus, and these rollers having different motions are driven by at least three driving motors. However, to the manufacturers, the complicated and various control devices require an extremely complex manufacturing flow, and also lead to low assembling and manufacturing speed and high manufacturing cost.

In addition, as for the paper feeding path of the paper of U.S. Pat. No. 5,784,680, a transporting assembly having a plurality of rollers is required to transport the paper moving forward and backward. And in order to ensure the correct scanning sequence of the two pages of the paper to be scanned, after the first page Pg1 of the paper is scanned, the paper has to be fed into the switch-back channel to proceed the scanning of the second page. During the paper is transported and scanned, the next paper can not enter the scanning apparatus, thus the time for the next paper entering the scanning apparatus has to be delayed, and the scanning speed (scan per minute, SPM) is reduced substantially, which cannot satisfy the requirements of high speed and simplicity for current scanning apparatuses.

SUMMARY OF THE INVENTION

Accordingly, the object of the present invention is to provide a paper feeding mechanism for eliminating limitations or disadvantages of over complicated structure and low scanning speed of the double-side scanning apparatus in the prior art.

The paper feeding mechanism of the present invention is used to transport a paper passing through a scanning station having a scanning module, so as to capture an image of the paper. The paper feeding mechanism includes a partition, a paper transporting device, and a switching member. The partition is disposed corresponding to the scanning station, and a first paper feeding channel is formed between the partition and the scanning station. A second paper feeding channel corresponding to the first paper feeding channel is formed on the other side of the partition. The paper transporting device is provided for transporting the paper passing over the partition through the first paper feeding channel with a first page of the paper facing the scanning module. Then the paper is flipped for a second page of the paper facing the scanning module. The switching member movably is disposed adjacent to one end to the partition, for guiding the paper passing through the first paper feeding channel or the second paper feeding channel.

The advantage of the present invention lies in that the number of components of the scanning apparatus for double-side scanning is reduced. The paper is transported with a s significantly i simplified mechanism, And the path for transport paper to be scanned is also modified to increase the scanning speed substantially. Thus, the scanning time is reduced, and the correct sequence of the paper to be scanned is maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The paper feeding mechanism disclosed in the present invention is applied in electronic devices such as MFPs, scanners, copiers, or printers, having the function of capturing an image of paper. The accompanied drawings are for reference and illustration only, and are not intended to limit the present invention.

Figure 1:
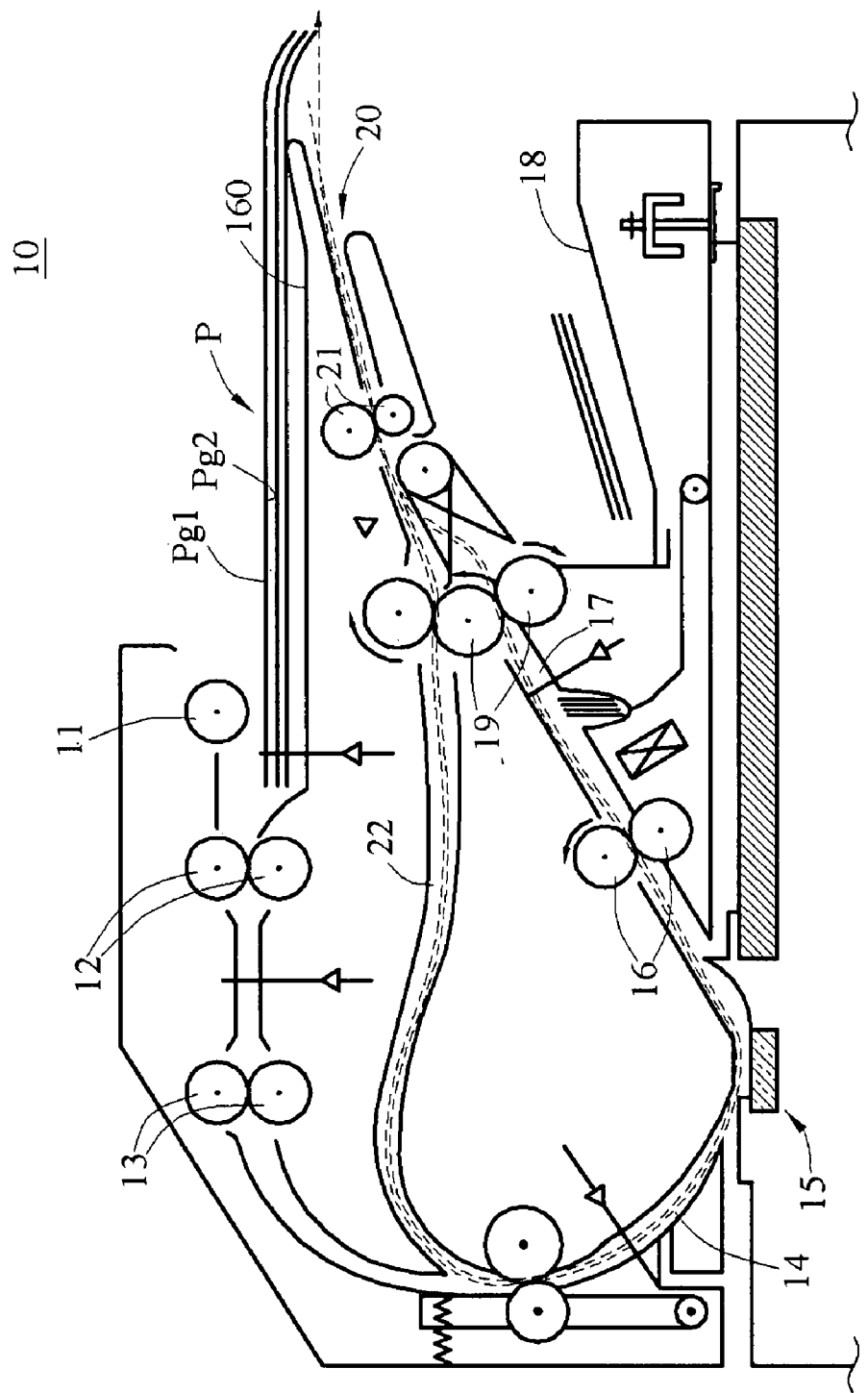
FIG. 1 is a schematic structural view of a scanning apparatus in the prior art.
Figure 2:
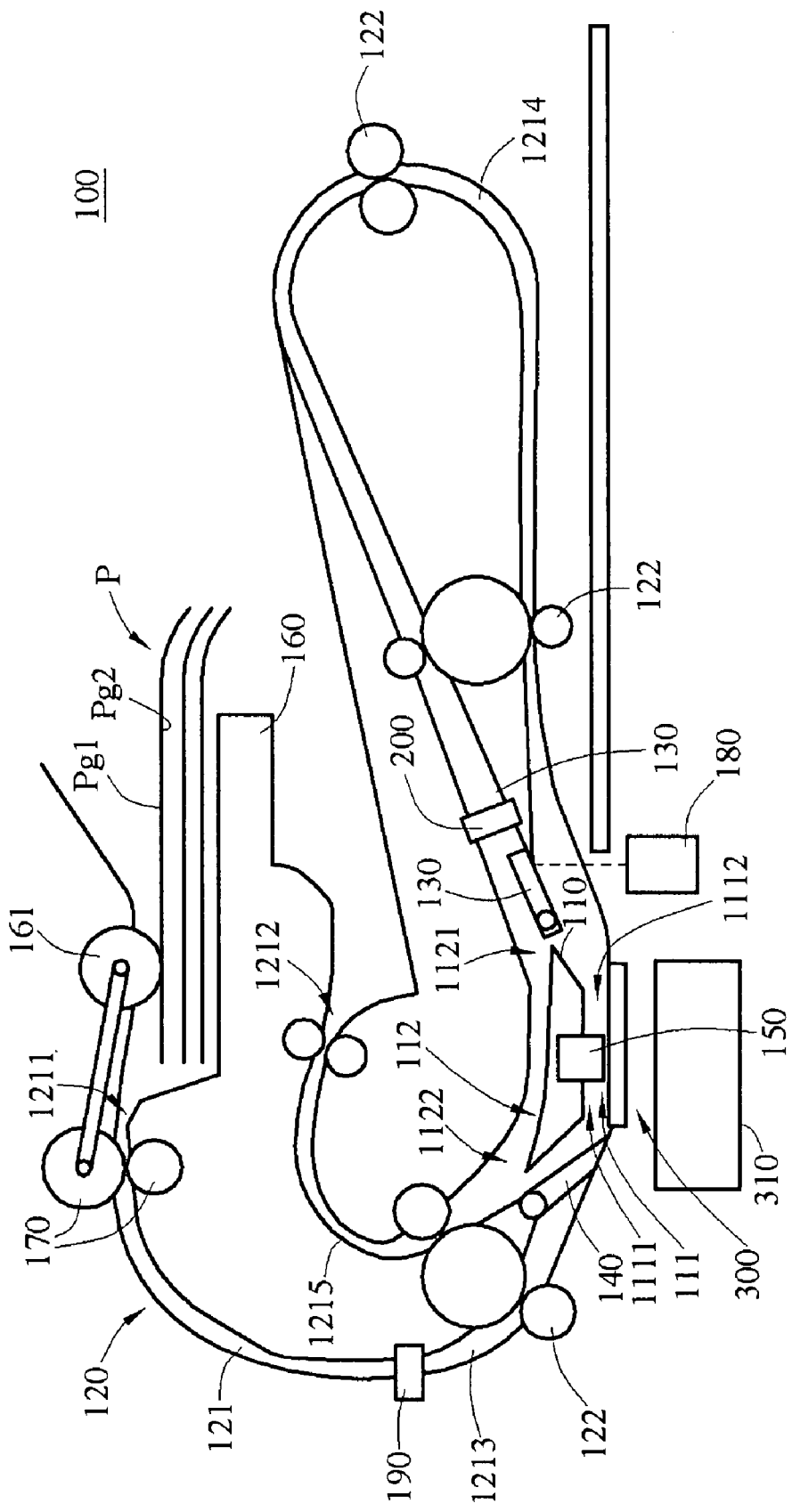
FIG. 2 is a schematic structural view of a paper feeding mechanism of an embodiment of the present invention.

Referring to FIG. 2, a paper feeding mechanism 100 according to an embodiment of the present invention is provided. The paper feeding mechanism 100 is provided for carrying a paper P passing through a scanning station 300 having a scanning module 310 for capturing the image of the paper P. The paper feeding mechanism 100 includes a partition 110, a paper transporting device 120, and a switching member 130.

The partition 110 is disposed corresponding to one side of the scanning station 300, and a first paper feeding channel 111 is formed between the partition 110 and the scanning station 300 for the paper P passing through the scanning station 300. A second paper feeding channel 112 corresponding to the first paper feeding channel 111 is formed on the other side of the partition 110. The paper transporting device 120 transports the paper P passing over the side facing the scanning station 300 of the partition 110 through the first paper feeding channel 111, with a first page Pg1 of the page P facing the scanning module 310, so as to scan the first page Pg1. After the first page Pg1 is scanned, the paper transporting device 120 transports the paper P leaving the scanning station 300, and the paper P is flipped for a second page Pg2 facing the scanning module 310. The switching member 130 is movably disposed adjacent to one end of the partition 110. The angle of the switching member 130 can be selectively adjusted by swinging the switch member 130, for guiding the paper P entering the second paper feeding channel 112, or entering the first paper feeding channel 111 again with the second page Pg2 facing scanning module 310.

Referring to FIG. 2, in order to obtain the uniform depth of field on the paper P, the paper feeding mechanism 100 further includes a paper pressing member 150 disposed on the partition 110 and corresponding to the scanning module 310. When the paper P transported in the first paper feeding channel 111 arrives the scanning station 300, the paper pressing member 150 presses the paper P flatly onto the scanning module 310, so as to keep depth of field on the paper P, thus obtain better scanning quality.

Moreover, the first paper feeding channel 111 has a first end 1111 and a second end 1112, and the second paper feeding channel 112 has a third end 1121 corresponding to the second end 1121 and a fourth end 1122 corresponding to the first end 1111. The paper transporting device 120 includes a paper transporting channel 121 and a plurality of transporting rollers 122. The paper transporting channel 121 has an entrance end 1211 and an exit end 1212, and is joined with the ends 1111, 1112, 1121, 1122 of the first and second paper feeding channels 111, 112 to form a paper feeding route.

The paper P enters the paper transporting channel 121 from the entrance end 1211, and then is transported to the first paper feeding channel 111 through the first end 1111 by the transporting rollers 122, such that the paper P passes through the first paper feeding channel 111, and leaves the first paper feeding channel 111 through the second end 1112. And then, the paper P selectively enters the second paper feeding channel 112 through the third end 1121, leaves the second paper feeding channel 112 through the fourth end 1122, and is transported to the exit end 1212 to leave the paper transporting channel 121. Otherwise, the angle of the switching member 130 is adjusted and the switching member 130 guides the paper returning the paper feeding channel 111 to proceed the scanning of the second page Pg2. The paper transporting channel 121 has an entrance section 1213, a paper-flip section 1214, and an exit section 1215. One end of the entrance section 1213 of the paper transporting channel 121 is connected to the first end 1111, two ends of the paper-flip section 1214 are connected to the second end 1112 and the third end 1121 respectively, and the exit section 1215 is connected to the fourth end 1122, so as to form the paper feeding route to transport the paper P.

Referring to FIG. 2 again, a paper holder 160 is disposed to the entrance end 1211 of the paper transporting channel 121 for holding the paper P to be scanned. A pick-up roller 161 is disposed above the paper holder 160 for picking up the paper P and sending it into the paper feeding mechanism 100. A paper-separating roller 170 is disposed at the entrance end 1211 to drive the paper P to be scanned to enter the paper transporting channel 121. Moreover, a guiding member 140 is further disposed at the junction of the entrance section 1213 and the first end 1111. One end of the guiding member 140 is pivoted at one side of the entrance section 1213, and the other end of the guiding member 140 movably blocks the paper feeding route at the entrance section 1213 normally. The other end of the guiding member 140 is drawn down by gravity to block the entrance section 1213 for stopping the paper in the first paper feeding channel 111 from entering the entrance section 1213. When the paper P, which is guided by the switching member 130, returns the first paper channel 111 from paper-flip section 1214, the route from the first paper feeding channel 111 to the entrance section 1213 is blocked by the guiding member 140. Thus the paper P can only pass through the first paper feeding channel 111 from the first end 1111 two the second end 1112, and can not enter the entrance section 1213. Thus, the wrong action of the paper feeding mechanism 100 caused by the paper P with the second page Pg2 facing the scanning module 310 entering the entrance section 1213 from the first paper feeding channel 111 is avoided.

A solenoid 180 is provided to drive the switching member 130 to adjust the angle of the switching member 130. According to requirements for scanning, the angle and position of the switching member 130 is selectively adjusted, such that the paper P passes through the second paper feeding channel 112 to perform the one-side scanning, or returns the first paper feeding channel 111 to scan the second page Pg2. The paper feeding mechanism 100 further includes a first sensor 190 disposed at the entrance section 1213 and a second sensor 200 disposed at the paper-flip section 1214. When the paper P passes through the entrance section 1213, the first sensor 190 generates a first signal to the solenoid 180. After receiving the first signal, the solenoid 180 drive the switching member 130 to allow the paper P passing through the first paper feeding channel 111 smoothly. When the paper P passes through the paper-flip section 1214, the second sensor 200 generates a second signal to the solenoid 180. After receiving the second signal, the solenoid 180 drives the switching member 130 according to actual scanning requirements, and the switch member 130 selectively guides the paper P entering the second paper feeding channel 112 or returning the first paper feeding channel 111.

Figure 3A:
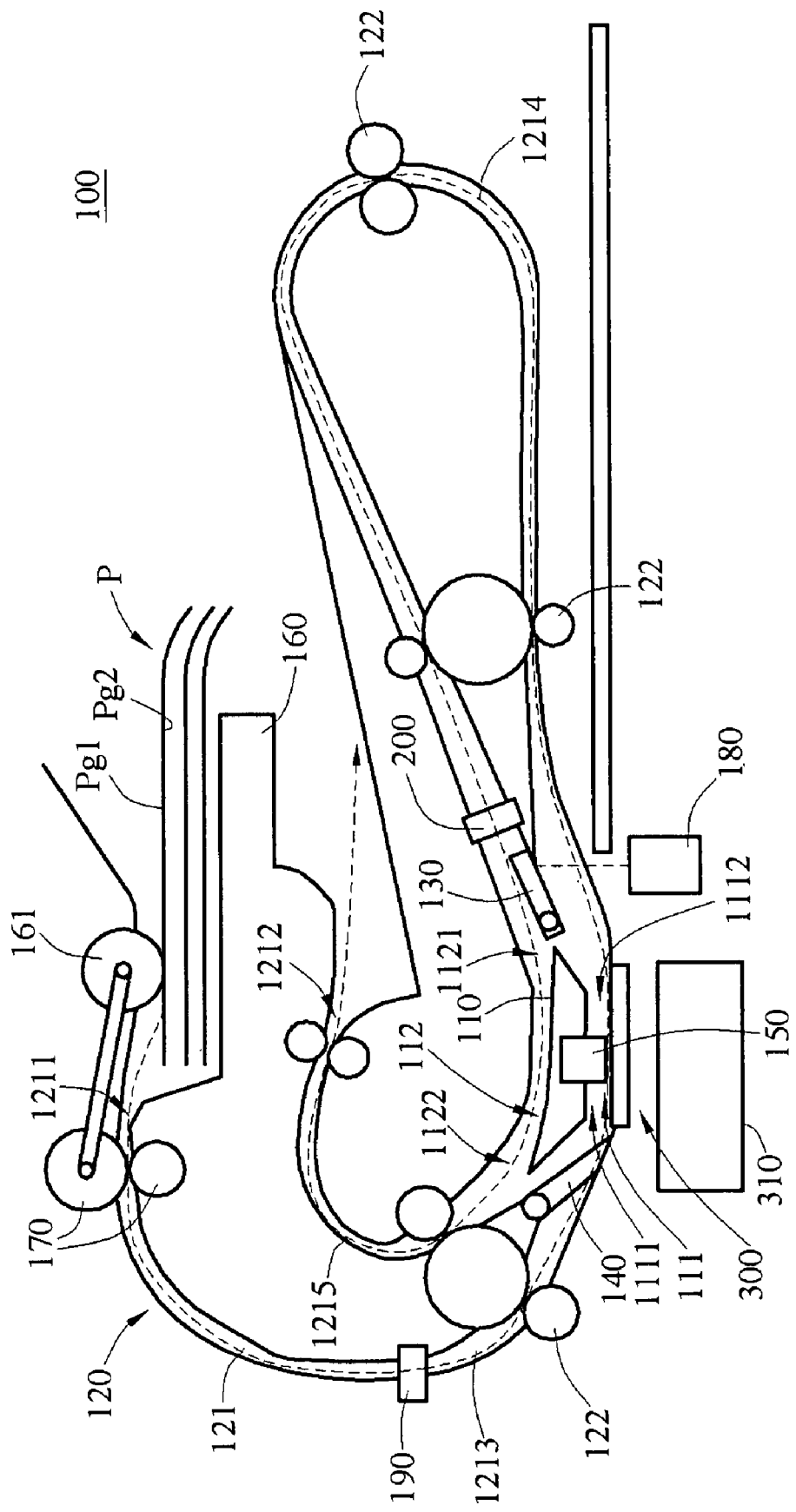
FIG. 3A is a schematic view of the process of the one-side scanning according to an embodiment of the present invention.
Figure 3B:
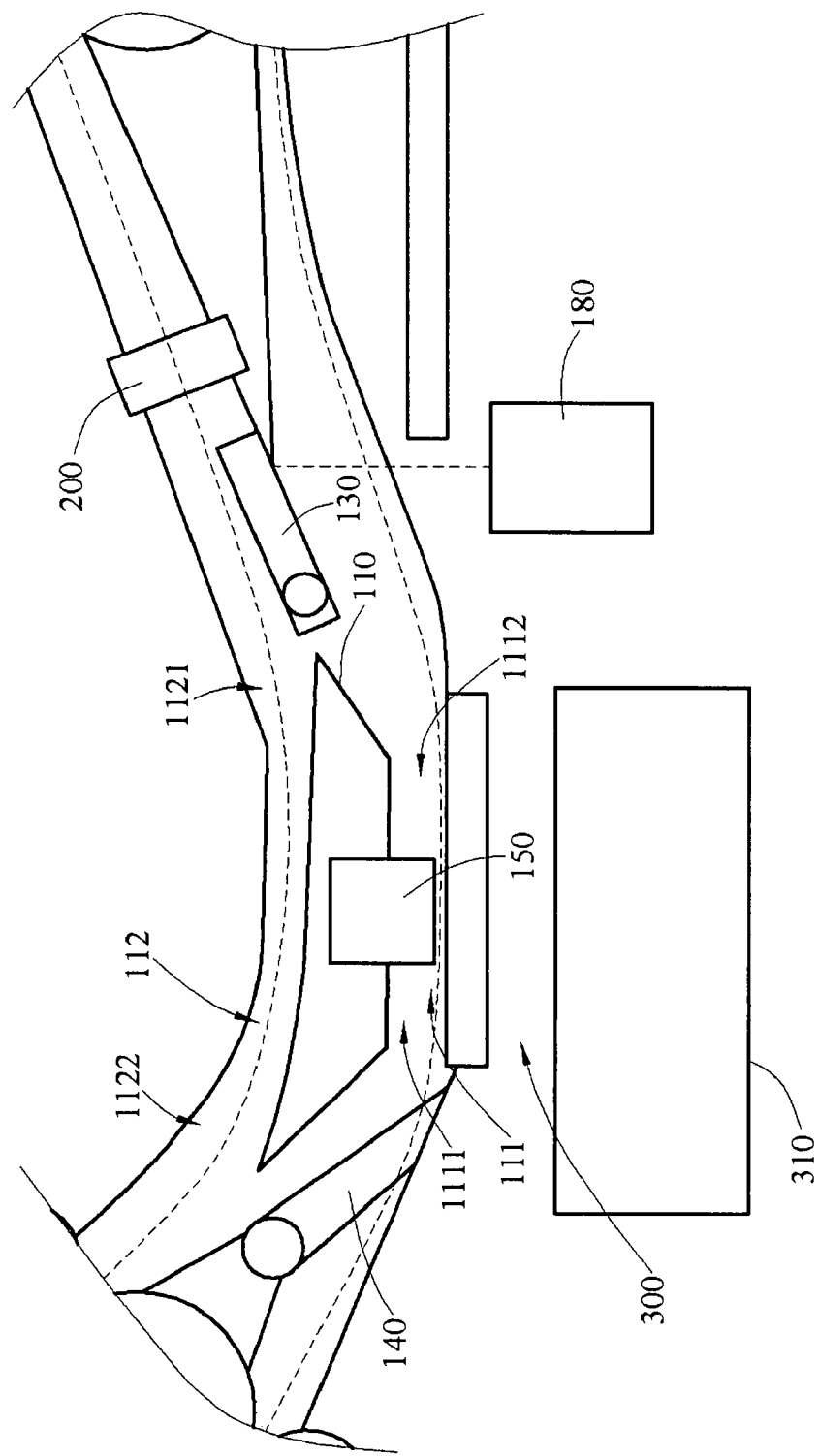
FIG. 3B is an enlarged schematic view of the process of the one-side scanning according to the embodiment of the present invention.

FIGS. 3A and 3B are schematic views of the paper feeding mechanism 100 of the present invention in the single-side scanning process. As shown in FIGS. 3A and 3B, the paper P in the paper holder 160 is sent to the paper-separating rollers 170 by the pick-up roller 161, and enters the paper transporting channel 121 through the entrance end 1211. The transporting rollers 122 then drive the paper P passing through the entrance section 1213 to the first paper feeding channel 111 to pass over the scanning station 300, and the paper pressing member 150 presses the paper P onto the scanning module 310 with the first page Pg1 facing the scanning module 310, so as to scan the first page Pg1. When the paper P passes through the entrance section 1213, the first sensor 190 generates the first signal to the solenoid 180, such that the switching member 130 are adjusted to be parallel to the first paper feeding path 111 by the solenoid 180. Thus, the scanned paper P is allowed to pass through the first paper feeding channel 111 smoothly and move to the paper-flip section 1214. The paper P then is driven by the transporting rollers to be flipped in the paper-flip section 1214, so as to have the second page Pg2 facing the scanning module 310. According to the requirements of the one-side scanning of the user, the solenoid 180 activates, and when the paper P arrives the second sensor 200, the switching member 130 is connected to the paper-flip section 1214 and the second paper feeding channel 113 to form a continuous paper feeding route, such that the paper P is passed over the switching member 130 and enters the second paper feeding channel 112, and then is transported to the exit section 1215 by the transporting rollers 122, and is sent out of the paper transporting channel 121 via the exit end 1212. Thus, the flow of one-side scanning of the paper P is complete.

Figure 4A:
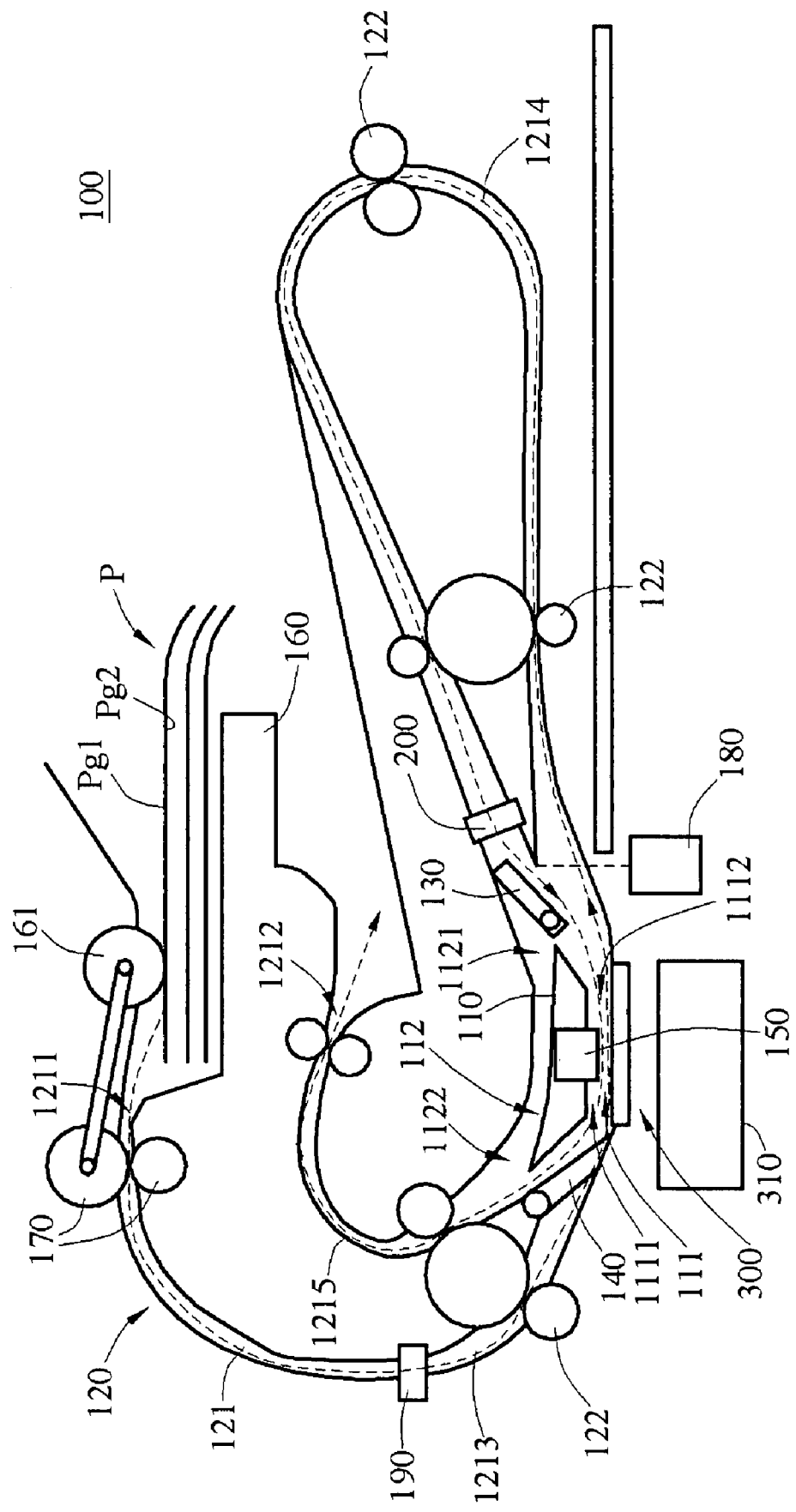
FIG. 4A is a schematic view of the process of the double-side scanning according to the embodiment of the present invention.
Figure 4B:
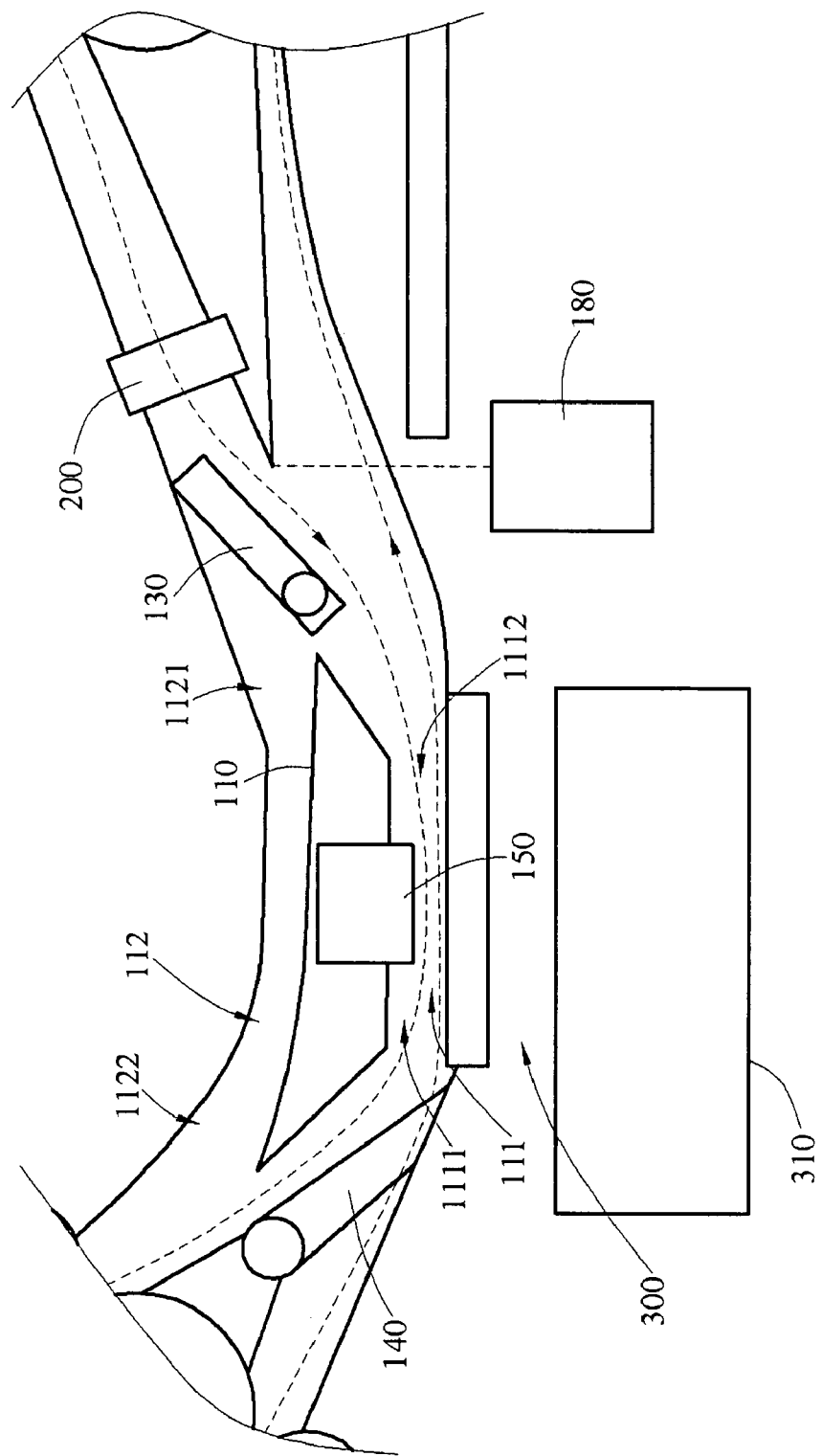
FIG. 4B is an enlarged schematic view of the process of the double-side scanning according to the embodiment of the present invention.

FIGS. 4A and 4B are schematic view of the paper feeding mechanism 100 in the double-side scanning process. The paper P in the paper holder 160 is sent to the paper-separating rollers 170, and enters the paper transporting channel 121 through the entrance end 1211. Then the paper P is driven by the transporting rollers 122 to pass through the entrance section 1213 to pass over the scanning station 300. The paper pressing member 150 presses the paper P onto the scanning module 310 with the first page Pg1 facing the scanning module 310, so as to scan the first page Pg1. When the paper P passes through the entrance section 1213, the first sensor 190 generates a first signal to the solenoid 180, such that the switching member 130 are adjusted to be parallel to the first paper feeding path 111 by the solenoid 180. Thus, the scanned paper P can pass through the first paper feeding channel 111 and move to the paper-flip section 1214. The paper P is driven by the transporting rollers to be flipped in the paper-flip section 1214, so as to have the second page Pg2 facing the scanning module 310. According to the requirements on the double-side scanning of the user, the solenoid 180 activates, and when the paper P passes through the second sensor 200, the switching member 130 is adjusted to block the paper feeding route to the second paper feeding channel 112, such that the paper P is guided to return the first paper feeding channel 111 to scan the second page Pg2. After the second page Pg2 is scanned, the paper P is driven by the transporting rollers 122 and is guided to the exit section 1215 along the guiding member 140, so as to prevent the wrong action of the paper feeding mechanism caused by the paper P entering the entrance section 1213 again. Finally, the paper P is sent out of the paper transporting channel 121 from the exit end 1212. Thus, the flow of double-side scanning of the paper P is complete.

Figure 5:
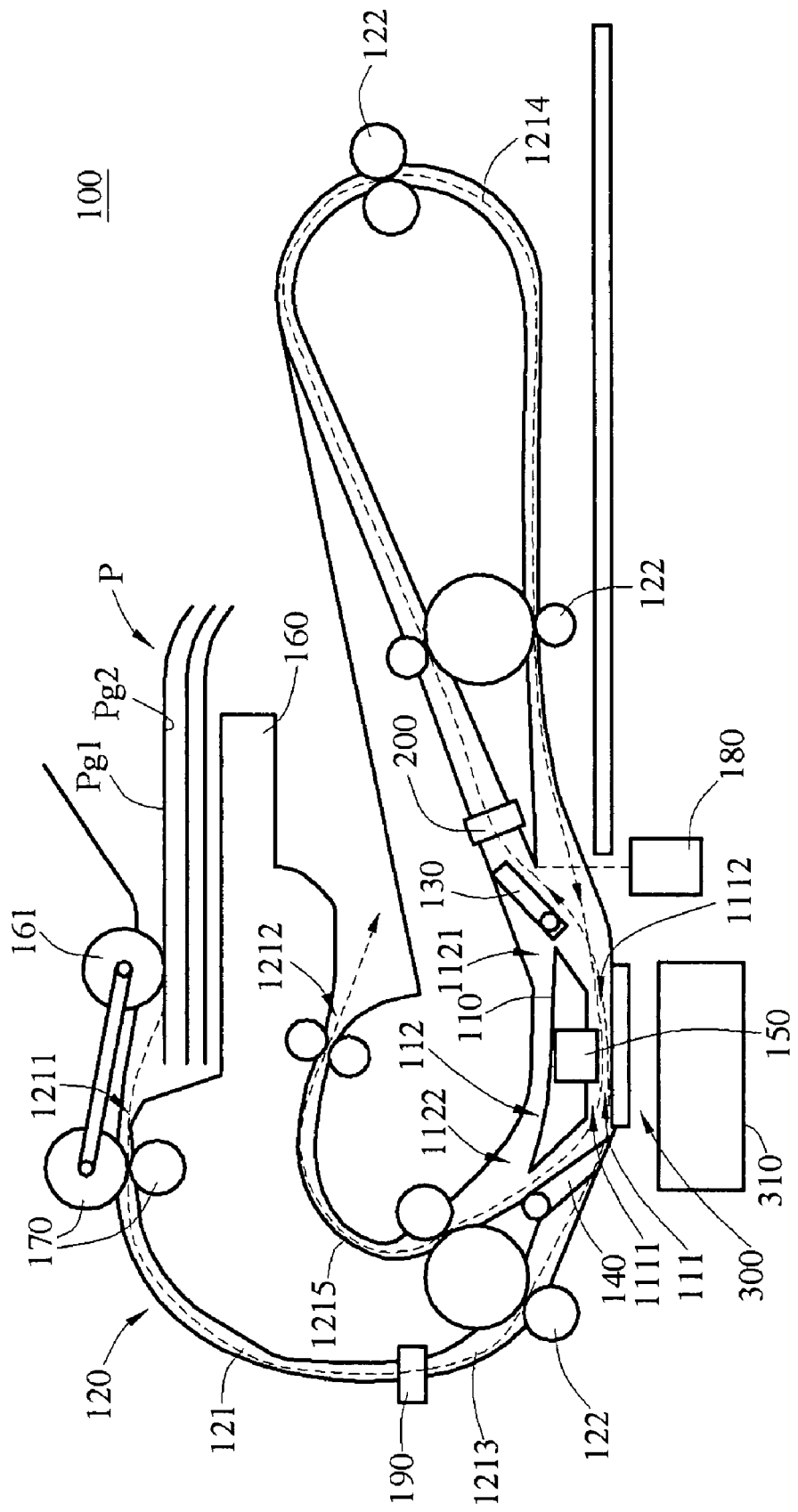
FIG. 5 is a schematic view of a different paper switch-back route in the double-side scanning according to the embodiment of the present invention.

FIG. 5 is a schematic view of a different paper switch-back route of the paper feeding mechanism 100 when performing the double-side scanning according to the present invention. As shown in FIG. 5, the paper P is driven by the transporting rollers 122 to passes through the first paper feeding channel 111, and moves to the upper portion of the paper-flip section 1214, such that the paper P is flipped in a different transporting direction from the directions as shown in FIGS. 4A and 4B to face the scanning module 310, and is transported to the first paper feeding channel 111 in an opposite direction, so as to scan the second page Pg2 of the paper P. After the second page Pg2 is scanned, the paper P is driven by the transporting rollers 122 and is sent out of the paper transporting channel 121 along the guiding member 140. Thus, the flow of double-side scanning of the paper P is complete.

Compare with the double-side scanning apparatus in the prior art, the paper feeding mechanism disclosed in the present invention does not need complicated paper transporting system, the structure of the scanning device is significantly simplified substantially, and the route for transporting the paper substantially improves the scanning speed, thereby reducing the scanning time with the correct sequence of the paper to be scanned.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A paper feeding mechanism, for carrying a paper passing through a scanning station having a scanning module for capturing an image of the paper, the paper feeding mechanism comprising:

a partition, disposed corresponding to the scanning station, wherein a first paper feeding channel is formed between the partition and the scanning station, and a second paper feeding channel is formed on another side of the partition, the first paper feeding channel has a first end and a second end while the second paper feeding channel has a third end corresponding to the second end and a fourth end corresponding to the first end;

a paper transporting device, for transporting the paper passing over the side of the partition through the first paper feeding channel with a first page of the paper facing the scanning module, then after the paper is flipped for a second page of the paper facing the scanning module, selectively carrying the paper passing through the first paper feeding channel or the second paper feeding channel, the paper transporting device comprises:

a paper transporting channel, having an entrance end and an exit end, wherein the paper enters the paper transporting channel via the entrance end, and leaves the paper transporting channel via the exit end, wherein the paper transporting channel is connected to the first paper feeding channel and the second paper feeding channel to form a paper feeding route; and a plurality of transporting rollers, for transporting the paper to pass through the paper transporting channel; and a switching member, for guiding the paper flipped to pass through the second paper feeding channel or to return to the first paper feeding channel with the second page of the paper facing the scanning module;

wherein the paper is transported to the first paper feeding channel through the first end, and leaves the first paper feeding channel through the second end; then the paper selectively enters the second paper feeding channel through the third end, and leaves the second paper feeding channel through the fourth end, or the switching member guides the paper to return to the first paper feeding channel.

2. The paper feeding mechanism as claimed in claim 1, wherein the switching member is a swinging member movably disposed adjacent to one end of the partition, and an angle of the swinging member is capable of being selectively adjusted.

3. The paper feeding mechanism as claimed in claim 1, further comprising a paper pressing member disposed on the partition and corresponding to the scanning module, for pressing the paper onto the scanning module.

4. The paper feeding mechanism as claimed in claim 1, further comprising a paper holder disposed to the entrance end for holding the paper.

5. The paper feeding mechanism as claimed in claim 4, further comprising a pick-up roller disposed above the paper holder for picking up the paper.

6. The paper feeding mechanism as claimed in claim 1, further comprising a paper-separating roller disposed at the entrance end to drive the paper to enter the paper transporting channel.

7. The paper feeding mechanism as claimed in claim 1, wherein the paper transporting channel comprises:

an entrance section, connected to the first end;
a paper-flip section, connected to the second end and the third end; and
an exit section, connected to the first end and the fourth end.

8. The paper feeding mechanism as claimed in claim 7, further comprising a guiding member disposed at the junction of the entrance end and the first end, wherein one end of the guiding member is pivoted at one side of the entrance section, and the other end of the guiding member blocks the entrance section normally for stopping the paper, to return to the first paper feeding channel by the switching member, from entering through the entrance section.

9. The paper feeding mechanism as claimed in claim 7, further comprising an solenoid for driving the switching member.

10. The paper feeding mechanism as claimed in claim 9, further comprising a first sensor disposed at the entrance section for generating a first signal to the solenoid when the paper passes through the entrance section, and the solenoid driving the switching member to allow the paper to pass through the first paper feeding channel after the solenoid receives the first signal.

11. The paper feeding mechanism as claimed in claim 9, further comprising a second sensor disposed at the paper-flip section for generating a second signal to the solenoid when the paper passes through the paper-flip section, and the solenoid driving the switching member selectively to guide the paper entering the first paper feeding channel or the second channel after the solenoid receives the first signal.

* * * * *